United States Patent
Kamamura et al.

(10) Patent No.: US 6,464,616 B1
(45) Date of Patent: Oct. 15, 2002

(54) TOROIDAL-TYPE CONTINUOUSLY VARIABLE TRANSMISSION

(75) Inventors: Yuko Kamamura, Saitama (JP); Yasutami Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/588,346

(22) Filed: Jun. 7, 2000

(30) Foreign Application Priority Data

Jun. 11, 1999 (JP) .......................................... 11-164623

(51) Int. Cl.[7] .............................................. F16H 15/38
(52) U.S. Cl. ............................... 476/72; 476/40; 476/46
(58) Field of Search .......................... 476/40, 42, 41, 476/43, 44, 45, 46, 72

(56) References Cited

U.S. PATENT DOCUMENTS 5,655,989 A    8/1997   Yamamoto

FOREIGN PATENT DOCUMENTS

| JP | 55-63048 | 5/1980 |
| JP | 62-71465 | 5/1987 |
| JP | 63-106456 | * 5/1988 |
| JP | 5-502242 | 6/1993 |
| JP | 6-288454 | * 10/1994 |
| JP | 7-310796 | 11/1995 |
| JP | 11-82659 | 3/1999 |

* cited by examiner

*Primary Examiner*—William C Joyce
(74) *Attorney, Agent, or Firm*—Sughrue Mion, PLLC

(57) ABSTRACT

The inner surface 2a of the input side disk 2 is composed of a near-inside-diameter portion, namely, a first arc surface 16 and a near-outside-diameter portion, namely, a second arc surface 17 in such a manner that the first and second arc surfaces 16 and 17 are allowed to continue with each other smoothly. The first arc surface 16 is formed as a single arc whose radius of curvature is $R_{2a}$. Also, the second arc surface 17 is recessed in the axial direction of the input side disk 2 further than the extension of the single arc, and the second arc surface 17 is formed so as to have a spiral curve.

2 Claims, 6 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used as a transmission unit of a transmission for use in a car, or a transmission for use in various kinds of industrial machines.

2. Description of the Related Art

Conventionally, it has been studied that such a toroidal-type continuously variable transmission as schematically shown in FIGS. 4 and 5 is used as a transmission for a car. In this toroidal-type continuously variable transmission, as disclosed, for example, in JP-A-62-71465U, an input side disk 2 is supported concentric with an input shaft 1, while an output side disk 4 is fixed to the end portion of an output shaft 3 which is disposed concentric with the input shaft 1. Also, at the lateral positions of the extensions of the input and output shafts 1 and 3 between the two disks 2 and 4, there are disposed two trunnions 6, 6 each of which is capable of swinging about a pair of pivot shafts 5, 5 respectively situated at positions along an imaginary plane that is perpendicular to an imaginary line connecting the respective axes of the input and output shafts 1 and 3, and distanced from the intersection of the imaginary plane and imaginary line. This physical relation is hereinafter referred to as "torsional relation".

In other words, each of the trunnions 6, 6 is formed with a pair of pivot shafts 5 on outer surfaces of the two end portions thereof in such a manner that the pair of pivot shafts 5 are concentric with each other. Therefore, the pair of pivot shafts 5 are disposed in such a manner that they do not cross the center axes of the two disks 2, 4 but extend at right angles to the center axes of two disks 2, 4. Also, the base end portions of displacement shafts 7, 7 are respectively supported on the center portions of their associated trunnions 6, 6 such that the inclination angles of the respective displacement shafts 7, 7 can be freely adjusted by swinging the trunnions 6, 6 about their associated paired pivot shafts 5, 5. On the peripheries of the respective displacement shafts 7, 7 thus supported on their associated trunnions 6, 6, there are rotatably supported power rollers 8, 8, respectively. These power rollers 8, 8 are respectively held by and between the input side and output side disks 2, 4. Each of the mutually opposing inner surfaces 2a, 4a of the input side and output side disks 2, 4 has a cross section consisting of a concave surface which can be obtained when an arc having a center present on the extension of the center axis of the pivot shaft 6 is rotated about the input and output shafts 1 and 3. And, the peripheral surfaces 8a, 8a of the respective power rollers 8, 8, each of which is formed in a spherical-shaped convex surface, are respectively contacted with the inner surfaces 2a, 4a of the input side and output side disks 2, 4.

Between the input shaft 1 and input side disk 2, there is interposed a pressing device 9 such as a loading cam and, due to the pressing device 9, the input side disk 2 can be elastically pressed toward the output side disk 4. The pressing device 9 is composed of a cam plate 10 rotatable together with the input shaft 1 and a plurality of (for example, four) rollers 12, 12 which are respectively held by a retainer 11. On one side surface (in FIGS. 4 and 5, the left side surface) of the cam plate 10, there is formed a cam surface 13 which is a curved surface extending over the circumferential direction of the cam plate 10; and, on the outer surface (in FIGS. 4 and 5, the right side surface) of the input side disk 2 as well, there is formed a cam surface 14 which is similar to the cam surface 13. And, the plurality of rollers 12, 12 are supported in such a manner that they can be freely rotated about an axis extending in the radial direction with respect to the center of the input shaft 1.

When the above-structured toroidal-type continuously variable transmission is in use, in case where the cam plate 10 is rotated with the rotation of the input shaft 1, the cam surface 13 presses the plurality of rollers 12, 12 against the cam surface 14 formed on the outer surface of the input side disk 2. As a result of this, the input side disk 2 is pressed against the plurality of power rollers 8, 8 and, at the same time, due to the mutual pressing contact between the pair of cam surfaces 13, 14 and the plurality of rollers 12, 12, the input side disk 2 is caused to rotate. And, the rotation of the input side disk 2 is transmitted through the plurality of power rollers 8, 8 to the output side disk 4, so that the output shaft 3 fixed to the output side disk 4 can be rotated.

Now, description will be given below of a case where a rotation speed ratio (transmission ratio) between the input shaft 1 and output shaft 3 is changed. At first, when reducing the rotation speed ratio between the input shaft 1 and output shaft 3, the trunnions 6, 6 may be respectively swung about the pivot shafts 5, 5 in a predetermined direction to thereby incline the displacement shafts 7, 7 in such a manner that, as shown in FIG. 4, the peripheral surfaces 8a, 8a of the respective power rollers 8, 8 can be respectively contacted with the near-center portion of the inner surface 2a of the input side disk 2 and the near-outer-periphery portion of the inner surface 4a of the output side disk 4. On the other hand, when increasing the rotation speed ratio between the input shaft 1 and output shaft 3, the trunnions 6, 6 may be respectively swung in the opposite direction about the pivot shafts 5, 5 to thereby incline the displacement shafts 7, 7 in such a manner that, as shown in FIG. 5, the peripheral surfaces 8a, 8a of the respective power rollers 8, 8 can be respectively contacted with the near-outer-periphery portion of the inner surface 2a of the input side disk 2 and the near-center portion of the inner surface 4a of the output side disk 4. In case where the inclination angles of the displacement shafts 7, 7 are set in the middle of the inclination angles respectively shown in FIGS. 4 and 5, there can be obtained a middle transmission ratio between the input shaft 1 and output shaft 3.

Conventionally, the cross-sectional profile (hereinafter referred to as bus shape or shape of the bus) of the inner surface 2a of the input side disk 2 forming the toroidal-type continuously variable transmission which is structured and operates in the above-mentioned manner is generally formed in a single arc whose radius of curvature does not vary on the way as shown in FIG. 6. Incidentally, the shape of the bus of the inner surface 4a of the output side disk 4 is the same as that of the inner surface 2a of the input side disk 2, and the description thereof is omitted. That is, the bus shape is set as an arc surface having a single curvature which has not only a center of curvature $O_{2a}$ situated at a point nearer to the center axis of the input side disk than the outer peripheral edge of the input side disk 2 having an outside diameter $D_2$ but also a radius of curvature $R_{2a}$. The diameter (the pitch circle diameter of the inside surface 2a) P.C.D of a circle formed by connecting together the centers of curvature $O_{2a}$ of the buses is smaller than the outside diameter $D_2$ of the input side disk 2 (that is, P.C.D<$D_2$).

In an operation to grind the inner surface 2a of the input side disk 2 having the above-mentioned shape for finishing the same, as shown in FIG. 7, there is used a grinding wheel 15 in which the shape of the bus of the outer peripheral surface thereof is formed so as to be matched to the shape of the bus of the inner surface 2a, and thus, the inner surface 2a is ground on the grinding wheel 15, while rotating the grinding wheel 15 and input side disk 2. The grinding wheel 15 is rotated about a center axis $\alpha_{15}$ which is inclined by an angle $\theta_{15}$ toward the input side disk 2 side with respect to a virtual straight line A perpendicular to the center axis $\alpha_2$ of the input side disk 2. While the radius of curvature of the bus of the outer peripheral surface of the thus shaped grinding wheel 15 is $R_{2a}$, the size and installation position of the grinding wheel 15 can be respectively found in the following manner. By the way, the size of the grinding wheel 15 is expressed by its maximum diameter $D_{15}$ and the diameter $d_{15}$ of the portion of the outer peripheral surface of the grinding wheel 15 that is used to grind the outer peripheral edge portion of the inner surface 2a. Also, the installation position of the grinding wheel 15 is expressed in the form of a parameter which is associated with an intersection $O_{15\text{-}2}$ between the center axis $\alpha_{15}$ of the grinding wheel 15 and the center axis $\alpha_2$ of the input side disk 2. That is, the intersection $O_{15\text{-}2}$ is identical with a point at which a straight line $\beta_{2a}$ connecting the outer peripheral edge portion of the inner surface 2a to the center of curvature $O_{2a}$ of the inner surface 2a intersects with the center axis $\alpha_2$ of the input side disk 2. Thus, an intersecting angle $\theta_{2a}$ of straight line $\beta_{2a}$ and the center axis $\alpha_2$ is set as the value that represents the installation position of the grinding wheel 15.

$$\theta_{2a}=\sin^{-1}\{(D_2-\text{P.C.D})/2R_{2a}\}$$

$$d_{15}=(D_2/\sin\theta_{2a})\cdot\sin(\pi/2-\theta_{2a}-\theta_{15})$$

$$D_{15}=d_{15}+2R_{2a}\{1-\sin(\pi/2-\theta_{2a}-\theta_{15})\}$$

In order that the operation to grind the inner surface 2a of the input side disk 2 using the above-mentioned grinding wheel 15 can be executed with high efficiency, it is necessary to increase the peripheral speed of the outer peripheral surface of the grinding wheel 15. To increase such peripheral speed, there are available two methods, that is, in one of them, the outside diameter of the grinding wheel 15 is increased and, in the other, the rotational angular speed of the grinding wheel 15 is increased. Of the two methods, the method of increasing the rotational angular speed of the grinding wheel 15 is limited depending on the capacity of a grinding machine. In this case, it is necessary to employ the method of increasing the outside diameter of the grinding wheel 15. However, in case where the outside diameter of the grinding wheel 15 is increased excessively, there is a possibility that the outer peripheral surface of the grinding wheel 15 can interfere with the near-outer-peripheral portion of the inner surface 2a. That is, since the near-outer-peripheral portion of the inner surface 2a, which is situated to the outside diameter side than the above-mentioned P.C.D., projects on the grinding wheel 15 side. Therefore, in case where the outside diameter of the grinding wheel 15 increases, the outer peripheral surface of the grinding wheel 15 is contacted with the portion of the inner surface 2a that is shifted from the portion of the inner surface 2a to be ground originally. In this state, there is generated excessive resistance with respect to the rotation of the input side disk 2 and grinding wheel 15 and, at the same time, the near-outer-peripheral portion of the inner surface 2a is ground more than necessary, with the result that the shape of the inner surface 2a is shifted from its desired shape.

On the other hand, in JP-A-55-63048, JP-A-7-310796, JP-A-11-82659, and JP-W-5-503342, there is disclosed a technology of forming the bus shape of the inner surface 2a not into a single arc, but into a composite curved surface whose radius of curvature changes on the way with respect to the diameter direction thereof. However, of these publications, the objects of the inventions respectively disclosed in JP-A-55-63048 and JP-A-11-82659 are to reduce loss caused by spin occurring in the contact portion between the inner surface of a disk and the peripheral surface of a power roller. Then, to attain the objects, the radius of curvature of the inner surface is simply made to vary continuously but, in these inventions, there does not exist a technical idea of enhancing the efficiency of an operation to grind the inner surface. Also, the objects of the inventions respectively disclosed in JP-A-7-310796 and JP-W-5-503342 are to reduce the surface pressure of the contact portion between the inner surface of a disk and the peripheral surface of a power roller. Then, to achieve the objects, the radius of curvature of the inner surface is set large on the inside diameter side and small on the outside diameter side. Similarly to the former two inventions, in these inventions, there does not exist a technical idea of enhancing the efficiency of an operation to grind the inner surface.

SUMMARY OF THE INVENTION

The present invention aims at eliminating the drawbacks found in the above-mentioned conventional toroidal-type continuously variable transmissions. Accordingly, it is an object of the invention to provide a toroidal-type continuously variable transmission having a structure which can facilitate the grinding of the respective inner surfaces of input side and output side disks to thereby be able to reduce the cost of the toroidal-type continuously variable transmission.

In attaining the above object, according to the invention, there is provided a toroidal-type continuously variable transmission, comprising: two input and output side disks each including an inner surface formed in a concave surface having an arc-shaped cross section, the two disks being concentrically disposed on each other and being rotatably supported independent from each other; an even number of pivot shafts interposed between the two input and output side disks and situated at a torsional relation such that the pivot shafts do not intersect the center axes of the two disks and are perpendicular to the center axes of the two disks; a plurality of trunnions respectively swingable about the pivot shafts; a plurality of displacement shafts respectively projecting from the inner surfaces of the trunnions; and, a plurality of power rollers respectively held between the inner surfaces of the input and output side disks while being rotatably supported respectively on the peripheries of the displacement shafts, each of the power rollers including a peripheral surface formed in a spherical-shaped convex surface, wherein the bus shape of at least one of the inner surfaces of the two input and output side disks is formed in such a manner that the portion of the inner surface situated near to the inside diameter of the disk is formed as a first arc surface with a single arc and the portion of the inner surface situated near to the outside diameter of the disk is formed as a second arc surface with a radius of curvature larger than that of the first arc surface.

In addition, the second arc surfaces of the input and output side disks may be respectively formed as spiral curves.

Further, the above continuously variable transmission may be formed such that the first arc surface has a center of curvature situated nearer to the center axis of the disk than the outer peripheral edge of the disk, the outside diameter of the first arc surface is set substantially identical with P.C.D.

which is the diameter of a circle formed by connecting the centers of curvature, and the inside diameter of the second arc surface is set substantially identical with the P.C.D. so as to allow the inner peripheral edge of the second arc surface and the outer peripheral edge of the first arc surface to be smoothly continuous with each other.

In the above-structured toroidal-type continuously variable transmission according to the invention, the operation thereof to transmit power between the input and output side disks as well as the operation thereof to change the transmission ratio between these two disks are similar to those of the previously described conventional toroidal-type continuously variable transmission.

Especially, in the case of the toroidal-type continuously variable transmission according to the invention, even in case where the outside diameter of a grinding wheel for grinding the inner surfaces of the input and output side disks is increased, the outer peripheral surface of the grinding wheel and the near-outside-diameter portions of the inner surfaces of the input and output side disks are hard to interfere with each other. This allows use of a grinding wheel having a larger outside diameter than the conventional one, so that the efficiency of the operation to grind the inner surfaces of the input and output side disks can be enhanced.

DETAILED DESCRIPTION OF THE PREFERRED EMBODIMENTS

Figure 1:
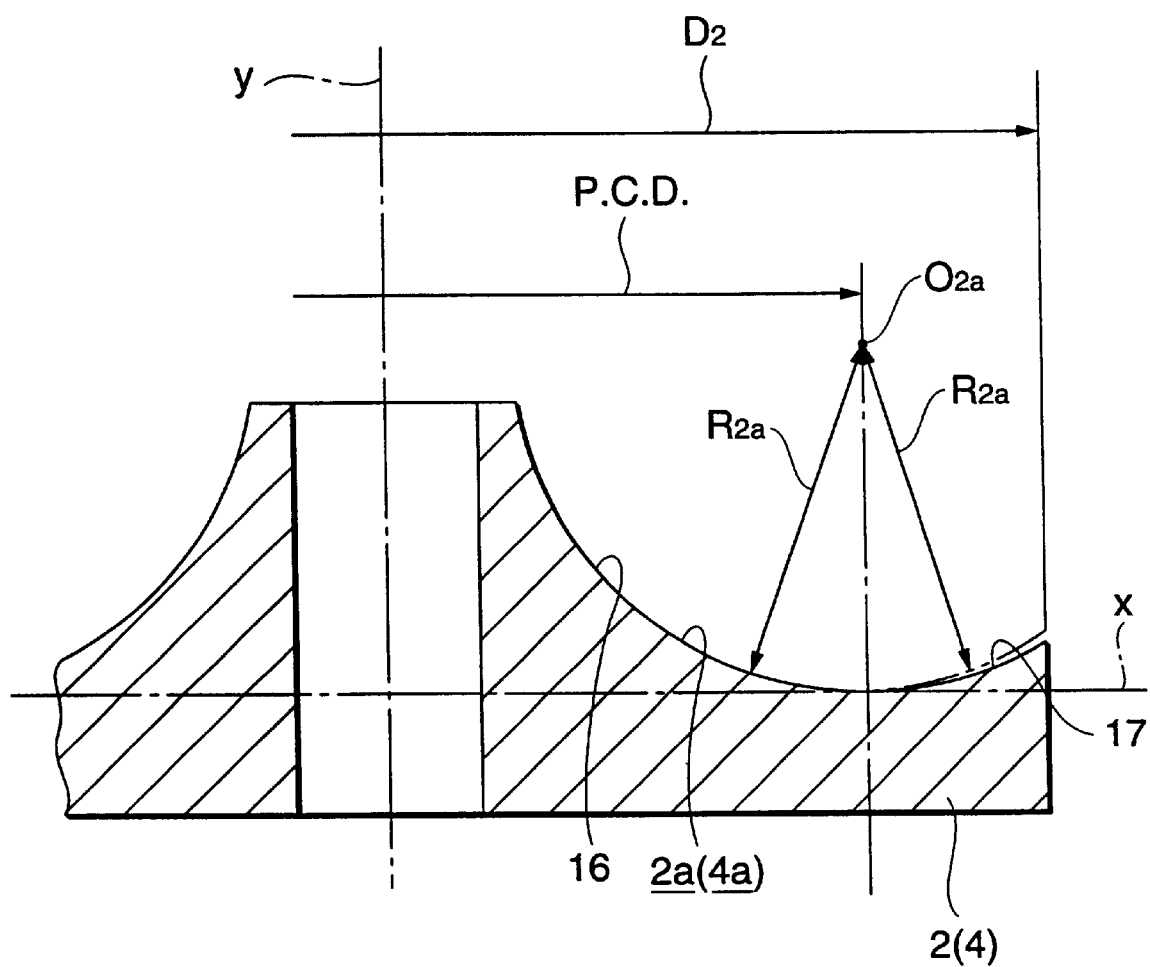
FIG. 1 is apartial section view of an input side disk showing an example in a mode for carrying out the invention.
Figure 2:
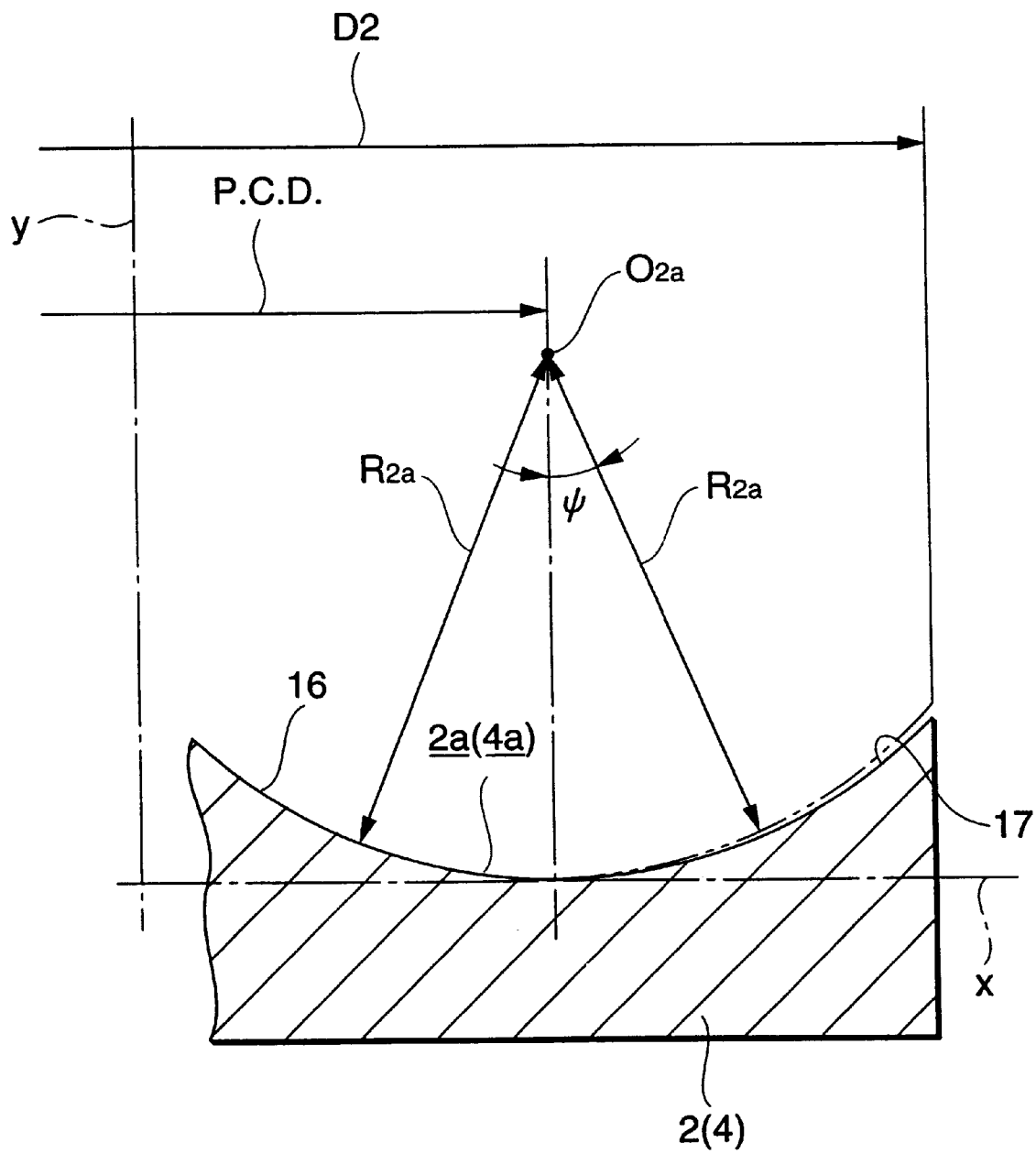
FIG. 2 is an enlarged section view of the main portions of the above input side disk.

Now, FIGS. 1 and 2 show an example of a mode for carrying out the invention. By the way, a toroidal-type continuously variable transmission according to the invention is characterized by the improved shape of the bus of the inner surface $2a$ of the input side disk 2 (as well as the improved shape of the bus of the inner surface $4a$ of the output side disk 4) thereof. The remaining portions of the present toroidal-type continuously variable transmission are similar in the structure and operation thereof to those of the previously described conventional toroidal-type continuously variable transmissions. Therefore, the duplicate illustration and description relating to the equivalent portions are omitted here and description will be given below mainly of the characteristic portions of the invention.

In the inner surface of the input side disk 2 having an outside diameter $D_2$, the inside diameter side portion thereof is formed as a first arc surface 16 having a single curvature, whereas the outside diameter side portion thereof is formed as a spiral-curve-shaped, second arc surface 17 which is represented by $r = a \cdot \theta^n$ (where r and θ are respectively auxiliary variables, and a and n are respectively constants). Of the two arc surfaces, the first arc surface 16 is an arc surface having a single curvature which, similarly to the conventional structure shown in FIG. 6, has a center of curvature $O_{2a}$ situated at a point nearer to the center axis of the input side disk 2 than the outer peripheral edge of the input side disk 2 having an outside diameter $D_2$, and a radius of curvature $R_{2a}$. However, in the case of the inner surface $2a$ of the input side disk 2 which constitutes the toroidal-type continuously variable transmission according to the invention, the outside diameter of the first arc surface 16 is set almost identical with P.C.D which is the diameter of a circle formed by connecting together the above-mentioned centers of curvature $O_{2a}$. And, the inside diameter of the second arc surface 17 is set almost identical with P.C.D, whereby the inner peripheral edge of the second arc surface 17 and the outer peripheral edge of the first arc surface 16 are allowed to be smoothly continuous with each other.

The second arc surface 17 constituting the near-outside-diameter portion of the inner surface $2a$ of the input side disk 2, as shown by solid lines in FIGS. 1 and 2, is formed in a shape which is further recessed than the first arc surface 16 and thus has a larger radius of curvature than the radius of curvature of the single arc that can be obtained by extending the first arc surface 16 as it is, as in the conventional structure shown by chained lines in FIGS. 1 and 2. An operation to grind the inner surface $2a$ having a shape composed of the first and second arc surfaces 16, 17 connected together in a mutually smoothly continuous manner is carried out while rotating a grinding wheel having an outer peripheral surface formed so as to have a shape corresponding to the shapes of the first and second arc surfaces 16, 17.

As described above, in the case of the inner surface $2a$ of the input side disk 2 which constitutes the toroidal-type continuously variable transmission according to the invention, the second arc surface 17 extending outside of P.C.D. in the diameter direction is recessed in the axial direction thereof than the conventional shape shown by chained lines in FIGS. 1 and 2. That is, assuming here x-y coordinates where the center axis of the input side disk 2 is expressed as the y axis and a tangent relating to the bottom portion of the inner surface $2a$ is expressed as the x axis, the coordinates (x, y) representing the conventional shape shown by chained lines in FIGS. 1 and 2 can be expressed by the following equations (1), (2), respectively. Here, φ expresses a shift angle from the above-mentioned center of curvature $O_{2a}$.

$$x = (P.C.D./2) + R_2 \cdot \sin \phi \quad (1)$$

$$y = R_{2a}(1 - \cos \phi) \quad (2)$$

On the other hand, the coordinates (x, y) representing the shape according to the invention shown by the solid lines show a spirally-curved shape which can be represented by $r = a \cdot \theta^n$, that is, the present coordinates can be expressed by the following equations (3), (4).

$$x = (P.C.D./2) + r \cdot \cos \theta \quad (3)$$

$$y = r \cdot \sin \theta \quad (4)$$

Now, description will be given below of the concrete dimensions and shapes of an embodiment of a toroidal-type continuously variable transmission according to the invention.

The diameter of a circle connecting together the centers of curvature $O_{2a}$, (so called as pitch circle diameter) is set 154 mm, and a radius of curvature $R_{2a}$ is set 48.5 mm. Also, in an equation $r = a \cdot \theta^n$ representing a spirally-curved shape forming the second arc surface in the case of the invention, it is assumed that $a=117.26$ and $n=1.05$. In this case, the outer peripheral edge of the first arc surface 16 formed by a single arc having a radius of curvature $R_{2a}$ and the inner peripheral edge of the above-mentioned second arc surface 17 are allowed to be smoothly continuous with each other at a position where the value of $\theta$ of a spiral curve represented by the above equation $r = a \cdot \theta^n$ on provides 0.3. Here, under the above conditions, the coordinates (x, y) of a point on an arc having a radius of curvature $R_{2a}$ in the x-y coordinates shown in FIG. 2 can be obtained from the above-mentioned equations (1) and (2), and the coordinates (x, y) of a point on a spiral curve represented by the equation $r = a \cdot \theta^n$ can be obtained from the above-mentioned equations (3) and (4). Table 1 shows the thus obtained coordinates (x, y).

TABLE 1

| Shapes | Coordinates x | y | Inclination | Radius of Curvature | Shift Angle $\Psi$ (deg) | Auxiliary Variables $\theta$ (deg) | r |
|---|---|---|---|---|---|---|---|
| Arc | 77.0 | 0 | 0 | 48.5 | 0.0 | | |
| Arc | 77.472 | 0.002 | 0.00973 | 48.5 | 0.6 | | |
| Spiral | 77.472 | 0.002 | 0.00973 | 48.5 | | 0.3 | 0.472 |
| Spiral | 78.671 | 0.029 | 0.03448 | 51.552 | | 1.0 | 1.672 |

Obviously from Table 1, an arc having a radius of curvature $R_{2a}$ which can be obtained from the above-mentioned equations (1) and (2), and a spiral curve represented by the equation $r = a \cdot \theta^n$ which can be obtained from the above-mentioned equations (3) and (4) are allowed to continue with each other smoothly at a point in the vicinity of the above-mentioned P.C.D., that is, at a point represented by the coordinates (x, y) where x=77.472 and y=0.002.

Also, at a point situated on the outside diameter side with respect to the above point, that is, at a point where x>77.472, the value of y obtained from the equation (4) is smaller than the value of y that is obtained from the equation (2). Of tables 2 and 3 which will be described next, Table 2 shows the values of the above-mentioned coordinates (x, y) in the case of the conventional shape shown in the previously discussed FIG. 6, whereas Table 3 shows the values of the above-mentioned coordinates (x, y) in the case of the shapes according to the invention shown in FIGS. 1 and 2, respectively.

TABLE 2

Conventional shape
Single Arc

| $R_{2a}$ | 48.5 | Radius of Curvature |
|---|---|---|
| Coordinates | | |
| x | y | $R_{2a}$ |
| 73 | 0.165 | 48.5 |
| 74 | 0.093 | 48.5 |
| 75 | 0.041 | 48.5 |
| 76 | 0.010 | 48.5 |
| 77 | 0.000 | 48.5 |
| 78 | 0.010 | 48.5 |
| 79 | 0.041 | 48.5 |
| 80 | 0.093 | 48.5 |
| 81 | 0.165 | 48.5 |
| 82 | 0.258 | 48.5 |
| 83 | 0.373 | 48.5 |
| 84 | 0.508 | 48.5 |
| 85 | 0.664 | 48.5 |
| 86 | 0.842 | 48.5 |
| 87 | 1.042 | 48.5 |
| 88 | 1.264 | 48.5 |
| 89 | 1.508 | 48.5 |
| 90 | 1.775 | 48.5 |
| 91 | 2.065 | 48.5 |
| 92 | 2.378 | 48.5 |
| 93 | 2.715 | 48.5 |
| 94 | 3.077 | 48.5 |
| 95 | 3.464 | 48.5 |
| 96 | 3.877 | 48.5 |
| 96.5 | 4.093 | 48.5 |

TABLE 3

Shapes according to the Invention
In case where a spiral curve is employed a 117.26   n 1.05

| Shapes | Auxiliary Variables $\theta$ | r | Coordinates x | y | Radius of Curvature | Inclination | Center of Curvature x | y | Amount of extra recessing |
|---|---|---|---|---|---|---|---|---|---|
| Arc | | | 73.000 | 0.165 | 48.500 | −0.083 | 77.000 | 48.500 | 0.000 |
| Arc | | | 74.000 | 0.093 | 48.500 | −0.062 | 77.000 | 48.500 | 0.000 |
| Arc | | | 75.000 | 0.041 | 48.500 | −0.041 | 77.000 | 48.500 | 0.000 |
| Arc | | | 76.000 | 0.010 | 48.500 | −0.021 | 77.000 | 48.500 | 0.000 |
| Arc | | | 76.530 | 0.002 | 48.500 | −0.010 | 77.000 | 48.500 | 0.000 |
| Arc | | | 77.000 | 0.000 | 48.500 | 0.000 | 77.000 | 48.500 | 0.000 |
| Arc | | | 77.472 | 0.002 | 48.500 | 0.010 | 77.000 | 48.500 | 0.000 |
| Spiral | 0.3 | 0.472 | 77.472 | 0.002 | 48.500 | 0.010 | 77.000 | 48.500 | 0.000 |
| Spiral | 0.5 | 0.807 | 77.807 | 0.007 | 49.757 | 0.017 | 76.979 | 49.757 | 0.000 |
| Spiral | 1.0 | 1.672 | 78.671 | 0.029 | 51.522 | 0.034 | 76.896 | 51.521 | 0.000 |
| Spiral | 1.5 | 2.559 | 79.558 | 0.067 | 52.595 | 0.053 | 76.784 | 52.589 | 0.001 |

TABLE 3-continued

Shapes according to the Invention
In case where a spiral curve is employed a 117.26  n 1.05

| Shapes | Auxiliary Variables | | Coordinates | | Radius of Curvature | Inclination | Center of Curvature | | Amount of extra recessing |
|---|---|---|---|---|---|---|---|---|---|
| | θ | r | x | y | | | x | y | |
| Spiral | 2.0 | 3.461 | 80.459 | 0.121 | 53.383 | 0.071 | 76.652 | 53.368 | 0.003 |
| Spiral | 2.5 | 4.375 | 81.371 | 0.191 | 54.015 | 0.090 | 76.504 | 53.986 | 0.007 |
| Spiral | 3.0 | 5.298 | 82.291 | 0.277 | 54.550 | 0.110 | 76.341 | 54.502 | 0.012 |
| Spiral | 3.5 | 6.229 | 83.217 | 0.380 | 55.021 | 0.129 | 76.167 | 54.948 | 0.020 |
| Spiral | 4.0 | 7.166 | 84.149 | 0.500 | 55.446 | 0.149 | 75.981 | 55.341 | 0.030 |
| Spiral | 4.5 | 8.110 | 85.085 | 0.636 | 55.838 | 0.169 | 75.785 | 55.694 | 0.042 |
| Spiral | 5.0 | 9.058 | 86.024 | 0.789 | 56.205 | 0.189 | 75.579 | 56.015 | 0.057 |
| Spiral | 5.5 | 10.012 | 86.966 | 0.960 | 56.554 | 0.210 | 75.363 | 56.310 | 0.075 |
| Spiral | 6.0 | 10.970 | 87.909 | 1.147 | 56.888 | 0.230 | 75.138 | 56.583 | 0.096 |
| Spiral | 6.5 | 11.931 | 88.855 | 1.351 | 57.213 | 0.251 | 74.904 | 56.837 | 0.120 |
| Spiral | 7.0 | 12.897 | 89.801 | 1.572 | 57.529 | 0.273 | 74.661 | 57.073 | 0.148 |
| Spiral | 7.5 | 13.866 | 90.747 | 1.810 | 57.841 | 0.294 | 74.410 | 57.295 | 0.179 |
| Spiral | 8.0 | 14.838 | 91.694 | 2.065 | 58.148 | 0.316 | 74.151 | 57.504 | 0.214 |
| Spiral | 8.5 | 15.813 | 92.639 | 2.337 | 58.453 | 0.339 | 73.883 | 57.699 | 0.253 |
| spiral | 9.0 | 16.791 | 93.585 | 2.627 | 58.757 | 0.362 | 73.608 | 57.883 | 0.297 |
| Spiral | 9.5 | 17.772 | 94.528 | 2.933 | 59.060 | 0.385 | 73.324 | 58.056 | 0.345 |
| Spiral | 9.9 | 18.584 | 95.307 | 3.199 | 59.312 | 0.404 | 73.084 | 58.190 | 0.388 |
| Spiral | 10.5 | 19.835 | 96.500 | 3.631 | 59.700 | 0.435 | 72.705 | 58.383 | 0.462 |

As can be seen obviously from Tables 2 and 3, in case where the first and second arc surfaces 16 and 17 are formed under the above-mentioned conditions, the second arc surface 17, namely, the near-outside-diameter portion of the inner surface 2a can be recessed further in the y-axis direction thereof (in FIGS. 1 and 2, can be situated lower) than the first arc surface 16, namely, the near-inside-diameter portion of the inner surface 2a; that is, there can be provided so called extra recessing in the second arc surface 17. For example, when the shape according to the invention and the conventional shape are compared with each other in the outer peripheral edge portion of the above-mentioned inner surface 2a represented by x=96.5 {=D$_2$/2=193/2 (mm)}, in the case of the conventional shape shown in Table 2, there is obtained y=4.093 (mm), whereas in the case of the shape according to the invention shown in Table 3, there is obtained y=3.631 (mm), which provides an amount of extra recessing of 0.462 (mm).

In this manner, since the outer peripheral edge of the inner surface 2a that is apt to interfere with the outer peripheral surface of the grinding wheel is recessed with respect to the y-axis direction, even in case where a grinding wheel having a large outside diameter is used, there can be prevented the mutual interference between the outer peripheral surface of the grinding wheel and the outer peripheral edge portion of the inner surface 2a.

Figure 7:
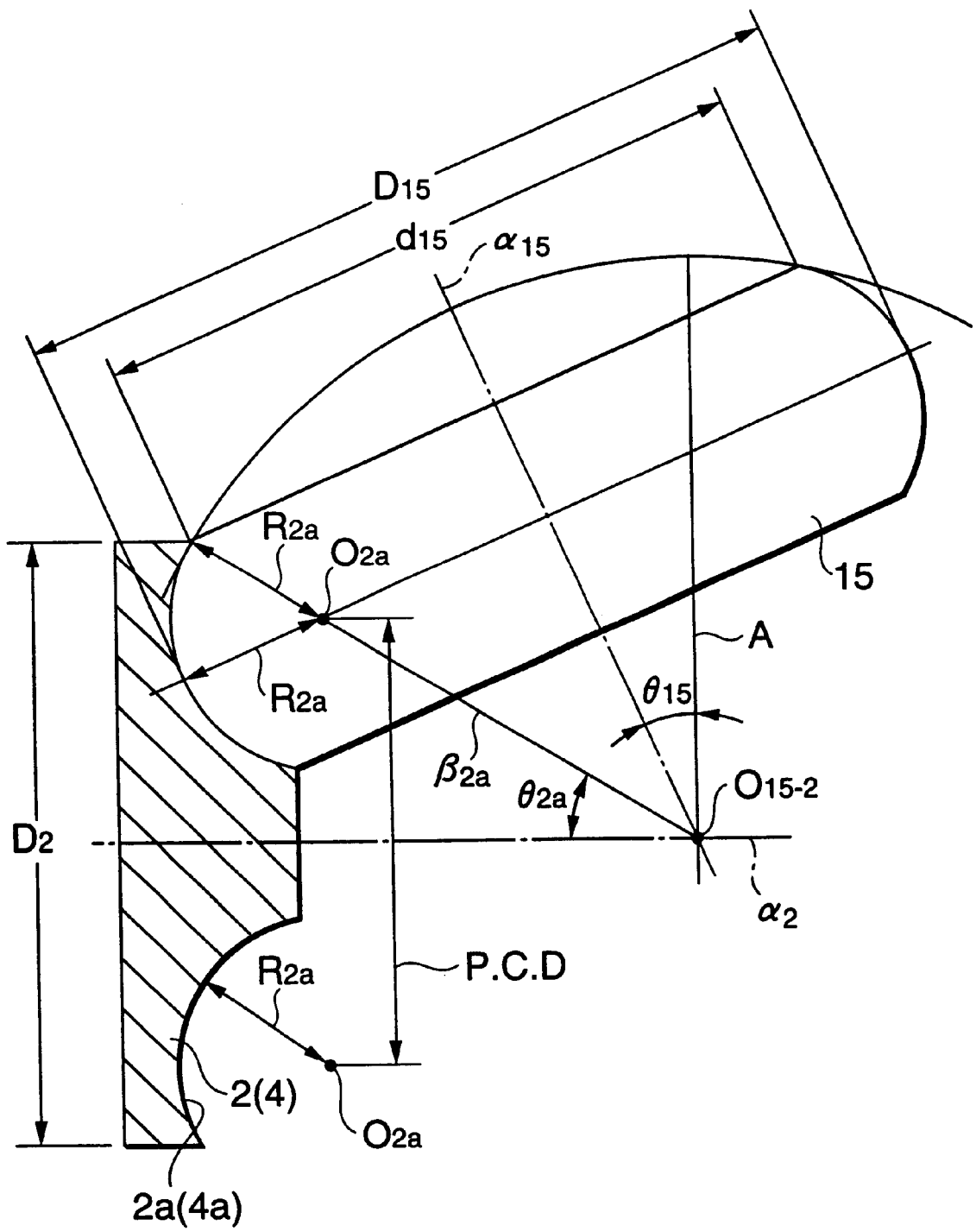

In the case of the conventional shape shown in Table 2, the size of a grinding wheel whose outer peripheral surface can interfere with the outer peripheral edge portion of the inner surface 2a, as well as, in the case of the shape according to the invention shown in Table 3, the size and installation position of a grinding wheel whose outer peripheral surface can interfere with the outer peripheral edge portion of the inner surface 2a are respectively shown in Table 4. By the way, the size of the grinding wheel, as shown in the previously discussed FIG. 7, is expressed by its maximum diameter $D_{15}$ and the diameter $d_{15}$ of the portion of the outer peripheral surface of the grinding wheel 15 that grinds the outer peripheral edge portion of the inner surface 2a. Also, the installation position of the grinding wheel is expressed as a cross angle $\theta_{2a}$ at which a straight line $\beta_{2a}$ connecting the outer peripheral edge portion of the inner surface 2a with the center of curvature $O_{2a}$ of the inner surface 2a crosses the center axis $\alpha_2$ of the input side disk 2.

TABLE 4

| Shapes | Coordinates | | Radius of Curvature | Center of Curvature | | Installation Position of Grinding wheel | Size of Grinding wheel | |
|---|---|---|---|---|---|---|---|---|
| | x | y | | x | y | $\theta_{2a}$ | d15 | D15 |
| Conventional | 96.5 | 4.093 | 48.5 | 77.0 | 48.5 | 23.71 | 316.8 | 349.8 |
| the invention | 96.5 | 3.631 | 59.7 | 76.774 | 59.977 | 19.29 | 418.1 | 452.0 |

As can be seen clearly from Table 4, according to the invention, even in case where the outside diameter of a grinding wheel for grinding the inner surface 2a of the input side disk 2 is increased, the outer peripheral surface of the grinding wheel can be made hard to interfere with the near-outside-diameter portion of the inner surface 2a of the input side disk 2. Thanks to this, using a grinding wheel having a larger outside diameter than the conventional one, the efficiency of the grinding operation of the inner surface 2a can be enhanced.

By the way, in Table 4, there is shown the limitative size (allowable maximum diameter) of the above grinding wheel. In fact, preferably, the size of a grinding wheel used to grind the inner surface 2a may be set in the order of 80% of the above-mentioned allowable maximum diameter. Therefore, in the case of the conventional shape, there can be used a grinding wheel having an outside diameter up to 280 mm or so; but, on the other hand, in the case of the shape according to the invention, it is possible to use a grinding wheel having an outside diameter up to 362 mm or so. Thus, according to the invention, use of a grinding wheel having an outside diameter about 1.3 times larger than the conventional shape is possible, so that the rotation speed of the grinding wheel can be reduced accordingly.

For example, when, in order to secure a required operation efficiency, about 3600 m/min. must be secured as the peripheral speed of a grinding wheel, in the case of the conventional shape, the rotation speed of the grinding wheel must be set on the order of 4100 r.p.m., whereas, according to the invention, the rotation speed of the grinding wheel may be set on the order of 3130 r.p.m. This speed reduction produces room in the performance of a grinding machine, which in turn provides an advantage in designing a grinding apparatus. Of course, in case where the rotation speed is set equal to that of the conventional structure, the peripheral speed of the grinding wheel can be increased to thereby enhance the efficiency of a grinding operation.

By the way, in carrying out the invention, the second arc surface 17 forming the near-outside-diameter portion of the inner surface 2a of each disk, preferably, as described above, may be a spiral curve represented by the equation $r = a \cdot \theta^n$ from the viewpoint of securing traction performance. However, the shape of the second arc surface 17 is not always limited to the spiral curve but it can also be an arc surface which is allowed to continue smoothly with the first arc surface 16 forming the near-inside-diameter portion of the inner surface 2a, has a larger radius of curvature than the radius of curvature $R_{2a}$ of the bus of the first arc surface 16 and does not vary in the radius of curvature on the way. An example of such arc surface is shown in Table 5.

In the shape shown in Table 5, the first arc surface 16 having a radius of curvature $R_{2a}$ of 48.5 mm and the second arc surface 17 having a radius of curvature of 58.5 mm are allowed to continue with each other smoothly in the portion of the P.C.D. (154 mm/2) which is the diameter of a circle connecting together the centers of curvature $O_{2a}$ of the first arc surface 16. According to this shape, unless the extra recessing amount is set large when compared with the shape in which the bus shape of the second arc surface 17 is formed in a spiral curve, use of a grinding wheel equivalent in the performance to the case of the spiral curve is not allowed. Next, the size and installation position of such grinding wheel as shown in Table 5 which can cause interference when its radius of curvature is discontinuously variable are shown in Table 6.

TABLE 5

Shape according to the Invention
In the case of shape having discontinuously variable radius of curvature

| Coordinates | | Radius of Curvature | Center of Curvature | | Extra Recessing Amount |
|---|---|---|---|---|---|
| x | y | Curvature | x | y | Amount |
| 73 | 0.165 | 48.5 | 77.0 | 48.5 | 0.000 |
| 74 | 0.093 | 48.5 | 77.0 | 48.5 | 0.000 |
| 75 | 0.041 | 48.5 | 77.0 | 48.5 | 0.000 |
| 76 | 0.010 | 48.5 | 77.0 | 48.5 | 0.000 |
| 77 | 0.000 | | | | 0.000 |
| 78 | 0.009 | 58.5 | 77.0 | 58.5 | 0.002 |
| 79 | 0.034 | 58.5 | 77.0 | 58.5 | 0.007 |
| 80 | 0.077 | 58.5 | 77.0 | 58.5 | 0.016 |
| 81 | 0.137 | 58.5 | 77.0 | 58.5 | 0.028 |
| 82 | 0.214 | 58.5 | 77.0 | 58.5 | 0.044 |
| 83 | 0.309 | 58.5 | 77.0 | 58.5 | 0.064 |
| 84 | 0.420 | 58.5 | 77.0 | 58.5 | 0.087 |
| 85 | 0.550 | 58.5 | 77.0 | 58.5 | 0.115 |
| 86 | 0.696 | 58.5 | 77.0 | 58.5 | 0.146 |
| 87 | 0.861 | 58.5 | 77.0 | 58.5 | 0.181 |
| 88 | 1.043 | 58.5 | 77.0 | 58.5 | 0.220 |
| 89 | 1.244 | 58.5 | 77.0 | 58.5 | 0.264 |
| 90 | 1.463 | 58.5 | 77.0 | 58.5 | 0.312 |
| 91 | 1.700 | 58.5 | 77.0 | 58.5 | 0.365 |
| 92 | 1.956 | 58.5 | 77.0 | 58.5 | 0.422 |
| 93 | 2.231 | 58.5 | 77.0 | 58.5 | 0.485 |
| 94 | 2.525 | 58.5 | 77.0 | 58.5 | 0.552 |
| 95 | 2.838 | 58.5 | 77.0 | 58.5 | 0.626 |
| 96 | 3.171 | 58.5 | 77.0 | 58.5 | 0.705 |
| 96.5 | 3.346 | 58.5 | 77.0 | 58.5 | 0.747 |

TABLE 6

| Shape | Coordinates | | Radius of Curvature | Center of Curvature | | Installation Position of Grinding wheel | Size of Grinding wheel | |
|---|---|---|---|---|---|---|---|---|
| | x | y | Curvature | x | y | $\theta_{2a}$ | d15 | D15 |
| Conventional | 96.5 | 4.093 | 48.5 | 77.0 | 48.5 | 23.71 | 316.8 | 349.8 |
| (*) | 96.5 | 3.346 | 58.5 | 77.0 | 58.5 | 19.47 | 413.2 | 446.68 |

(*): Shape having discontinuously variable radius of curvature

Figure 3:
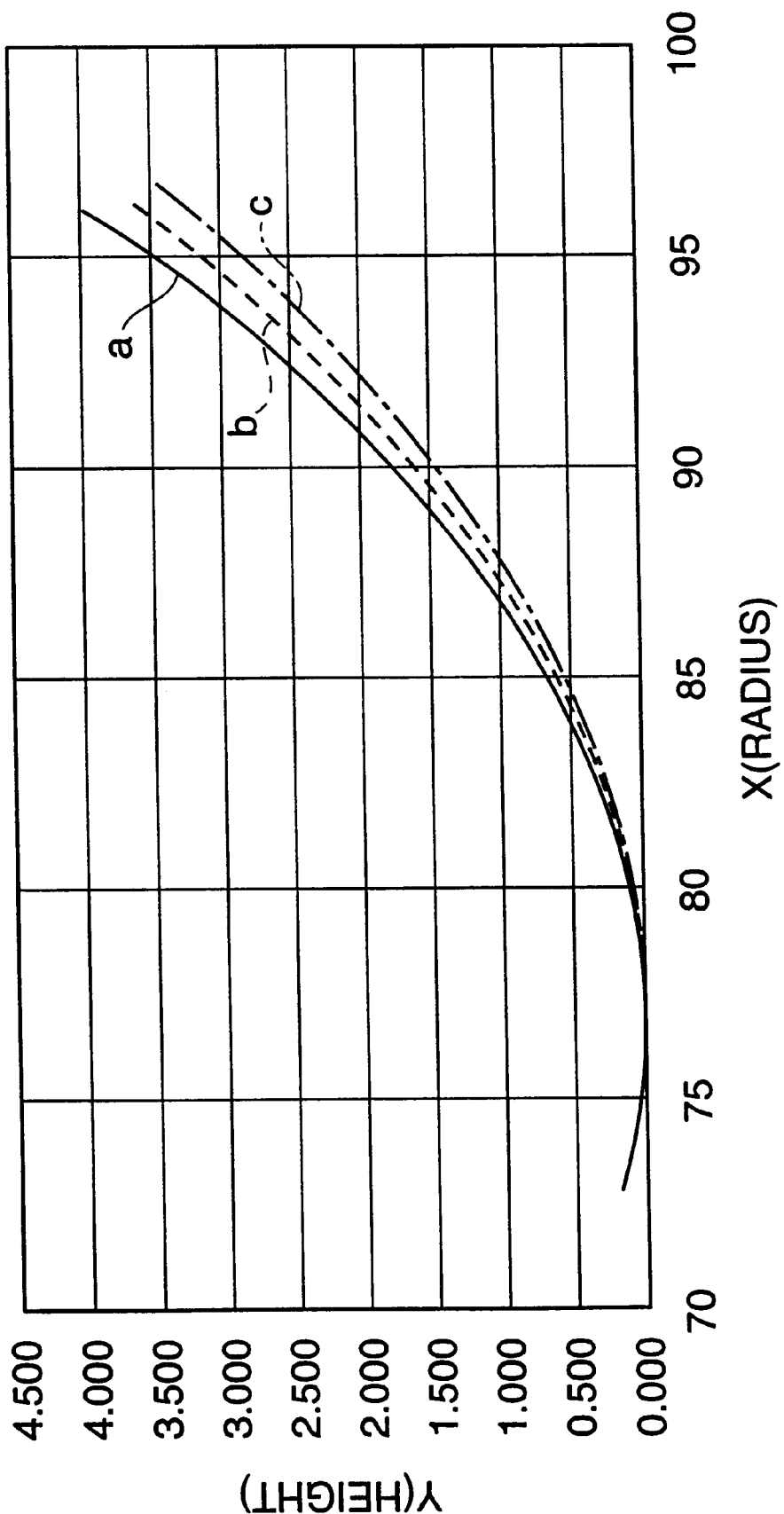
FIG. 3 is a graphical representation of three examples of the calculation results of the bus shape of the inner surface of a disk.
Figure 4:
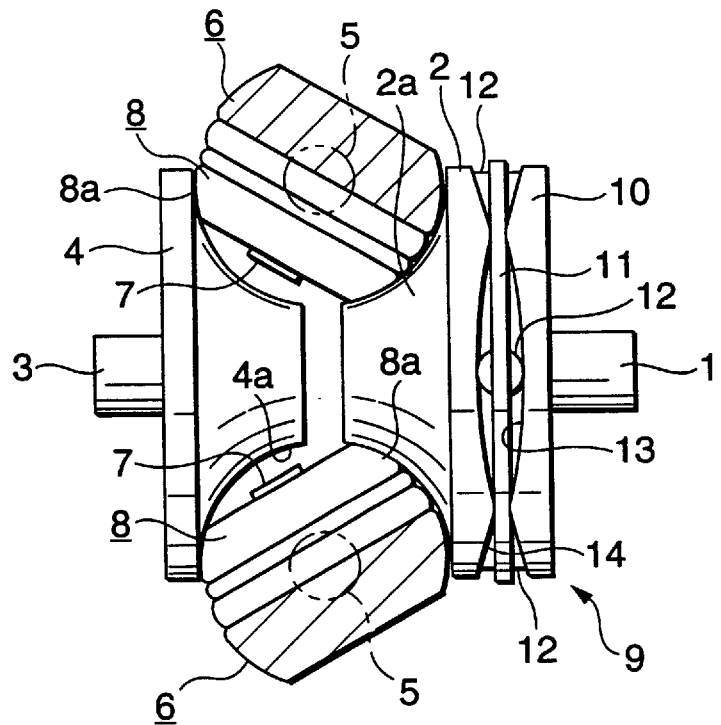
FIG. 4 is a schematic side view of the basic structure of a toroidal-type continuously variable transmission according to the invention, showing its maximum speed reduced state.
Figure 5:
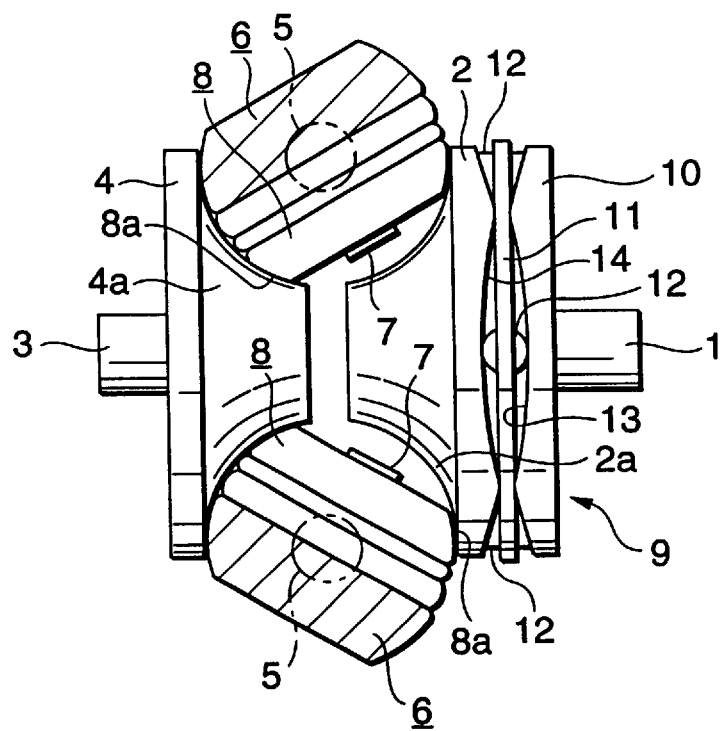
FIG. 5 is a schematic side view of the basic structure of the toroidal-type continuously variable transmission according to the invention, showing its maximum speed increased state.
Figure 6:
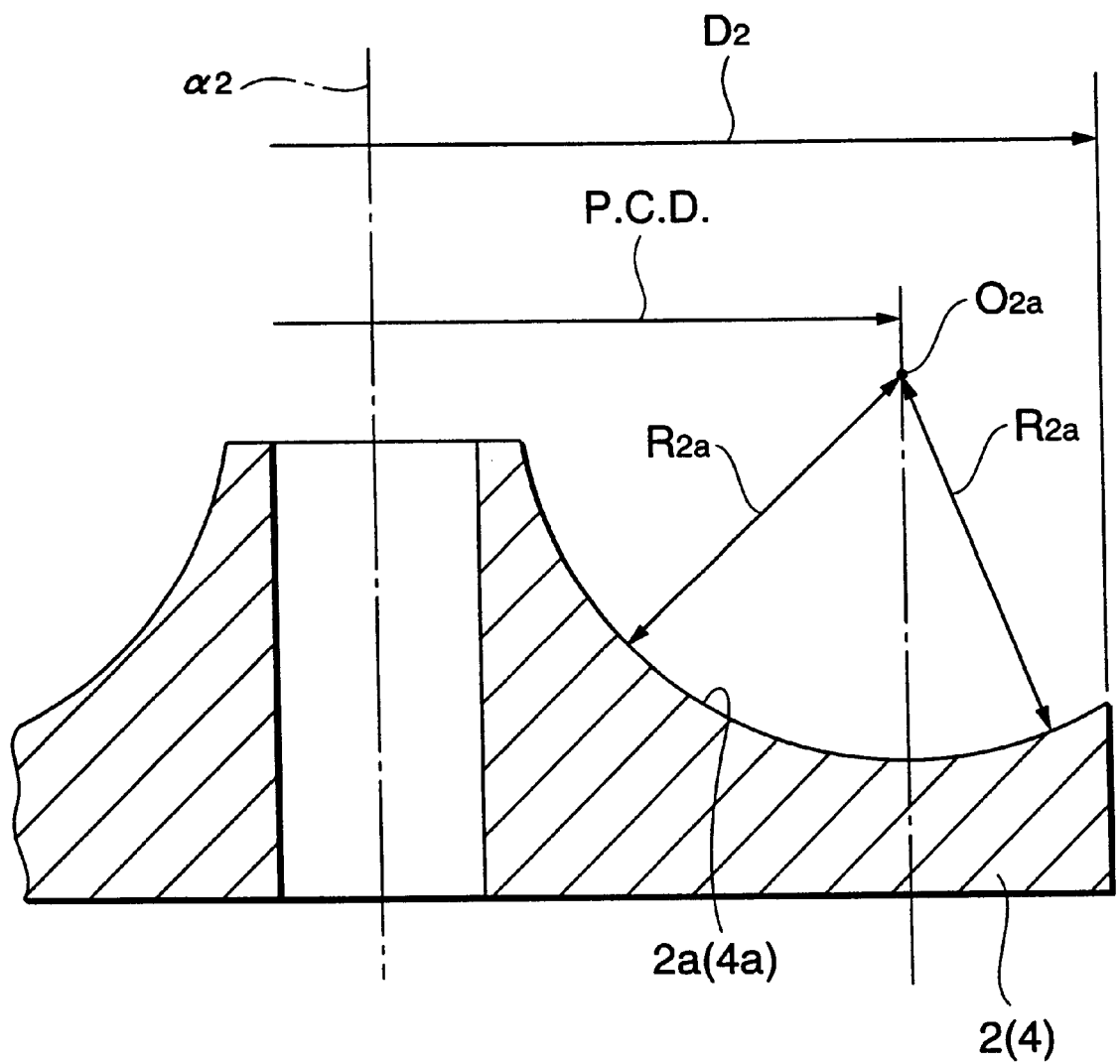
FIG. 6 is a partial section view of an input side disk incorporated in a conventional structure; and, FIG. 7 is a section view showing a grinding state of the inner surface of an input side disk.

The conventional shape shown in FIG. 6 provides such a shape as shown by a solid line a in FIG. 3 and, on the other hand, in case where the bus shape of the second arc surface 17 is formed as a spiral curve, there is provided such a shape as shown by a broken line b in FIG. 3. Further, in the case of the shape shown in Table 5, there is provided such a shape as shown by a chain line c in FIG. 3. As can be seen clearly from Tables 5, 6 and FIG. 3, in the case of a shape in which the radius of curvature of the bus shape of the second arc surface 17 is set larger than the radius of curvature of the bus shape of the first arc surface 16, that is, in the case of a shape in which its radius of curvature varies discontinuously, in order to allow use of a grinding wheel equivalent to the case of the spiral shape, there is necessary a shape having a larger recessing amount. Therefore, the shape in which its radius of curvature varies discontinuously may be unfavorable in some cases from the viewpoint of securing the performance of a toroidal-type continuously variable transmission. However, a curve that specifies the shape can be simplified, which can facilitate the molding of a grinding wheel for working this curved shape as well as the measurement of the bus shape.

By the way, when the radius of curvature on the inside diameter side is different from that on the outside diameter side, the maximum diameter (interference grinding wheel diameter) usable as a grinding wheel for grinding the inner surface with recessing enforced thereon, which is determined with respect to the bus shape of the inner surface having an extra amount of recessing while mutual interference between the outer peripheral surface of such grinding wheel and such inner surface is taken into account, provides the smallest one among the diameters that can be found from the centers of curvature and radiuses of curvature of the respective portions on such inner surface. And, in this case, the interference grinding wheel diameter, which can be obtained from the centers of curvature and radiuses of curvature of the outer-most outside diameter portions of such inner surface, regulates the diameter usable as the grinding wheel.

Since the present invention is structured and operates in the above-mentioned manner, the respective inner surfaces of the two input and output side disks of the toroidal-type continuously variable transmission can be ground with enhanced efficiency, which can contribute to reduction in the manufacturing cost of the toroidal-type continuously variable transmission.

What is claimed is:

1. A toroidal continuously variable transmission comprising:

input and output side disks each including an inner surface formed in a concave surface having an arc-shaped cross section, said disks concentrically disposed on each other and rotatably supported independent from each other;

an even number of pivot shafts interposed between said input and output side disks and situated such that said pivot shafts do not intersect the center axes of said disks and are perpendicular to said center axes of said disks;

a plurality of trunnions respectively swingable about said pivot shafts;

a plurality of displacement shafts respectively projecting from said trunnions; and a plurality of power rollers respectively held between the inner surfaces of said input and output side disks while being rotatably supported respectively on the peripheries of said displacement shafts, each of said power rollers including a peripheral surface formed in a spherical-shaped convex surface, wherein the cross-sectional profile of at least one of said inner surfaces of said input and output side disks is formed in such a manner that a portion of said inner surface situated near to the inside diameter of said disk is defined as a first arc surface having a single arc and a portion of said inner surface situated near to the outside diameter of said disk is defined as a second arc surface having a radius of curvature larger than that of said first arc surface, and further wherein said first arc surface has a center of curvature situated nearer to the center axis of said disk than the outer peripheral edge of said disk, the outside diameter of said first arc surface is set substantially identical with a pitch circle diameter which is the diameter of a circle formed by connecting said centers of curvature of said first arc surface, and the inside diameter of said second arc surface is set substantially identical with said pitch circle diameter so as to allow the inner peripheral edge of said second arc surface and the other peripheral edge of said first arc surface to be smoothly continuous with each other.

2. A toroidal continuously variable transmission according to claim 1, wherein said inner surfaces of said input and output disks respectively include said first and said second arc surfaces, and said second arc surfaces of said input and output side disks are respectively formed as spiral curves satisfying the following expression $r = a \cdot \theta^n$, where r and $\theta$ are auxiliary variables, whereas a and n are constants.

* * * * *